Aug. 27, 1929.  B. MAYER  1,726,443
AUTOMOBILE SIGNAL
Filed Oct. 23, 1928  2 Sheets-Sheet 1
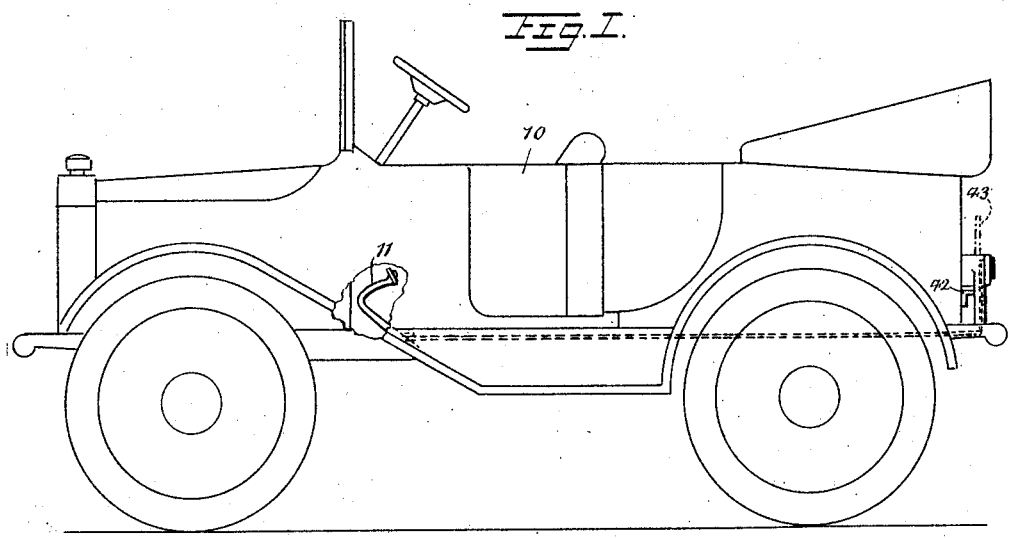
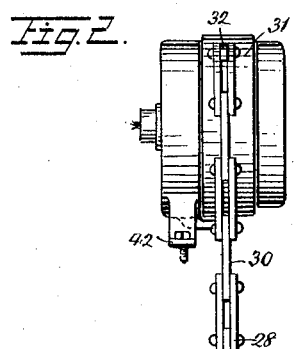
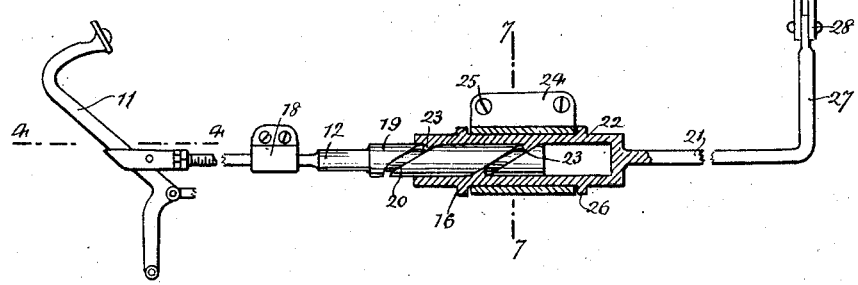
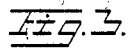
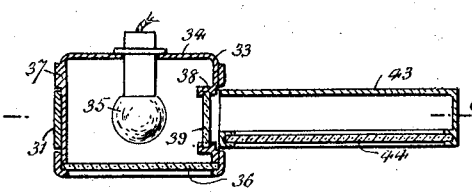
WITNESSES
INVENTOR
Benedict Mayer
BY
ATTORNEY Aug. 27, 1929.  B. MAYER  1,726,443
AUTOMOBILE SIGNAL
Filed Oct. 23, 1928  2 Sheets-Sheet 2
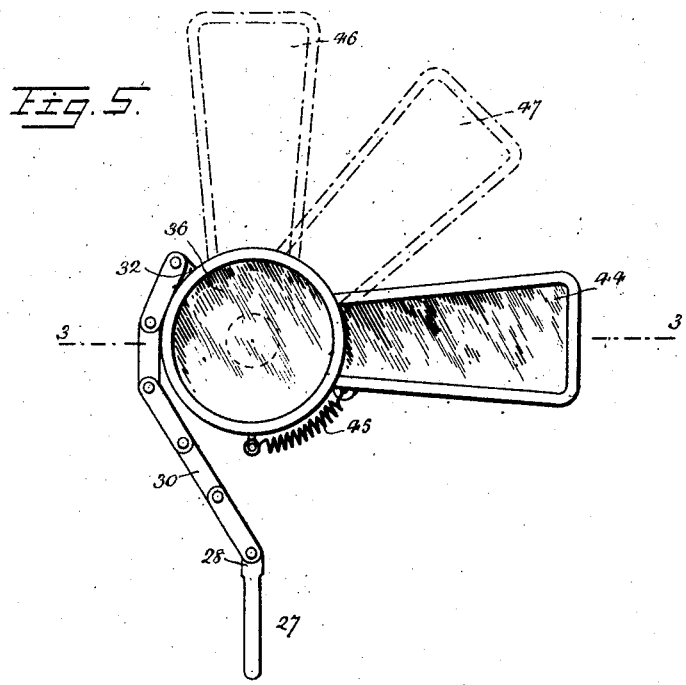
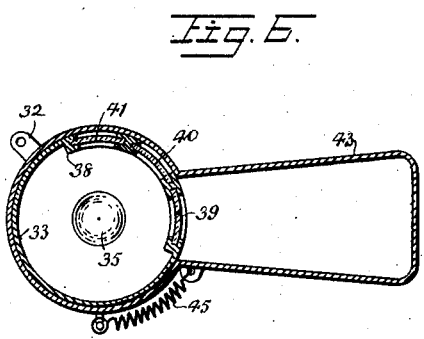
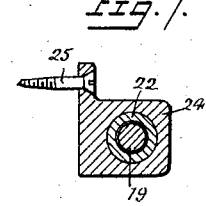
WITNESSES
INVENTOR
Benedict Mayer
BY
ATTORNEY Patented Aug. 27, 1929.

1,726,443

UNITED STATES PATENT OFFICE.

BENEDICT MAYER, OF NEW ORLEANS, LOUISIANA.

AUTOMOBILE SIGNAL.

Application filed October 23, 1928. Serial No. 314,448.

This invention relates to an automobile signalling device.

It is an object of the present invention to provide a new and improved signalling device adapted for use on road vehicles which is automatically operative in response to movement of one of the foot pedals controlling the device.

It is a further object of the invention to provide in a device of the character set forth, an improved signal automatically actuated through movement of the brake or clutch pedal of the device, and which includes a mechanical movement whereby the pivotal motion of the foot pedal is transformed into relative rotary motion of a signal operating arm.

A further object of the present invention is to provide in a signalling device an improved signal structure by means of which a signalling arm will be illuminated in a plurality of colors in response to the movement of the signalling arm.

A further object of the present invention is to provide in a signalling structure, a normally illuminated tail light, the illuminating bulb of which is adapted to selectively illuminate in a plurality of colors, a movable signalling arm, the relative position of the arm controlling the color of the illumination which is imparted thereto.

Other important objects of the present invention are to provide in a device of the character set forth, improved structural features and the combination and interrelation of parts whereby the whole forms a readily operable efficient apparatus conforming to the requirements of economical manufacture.

Numerous other objects and features of the present invention will be apparent from a consideration of the following specification taken in connection with the associated drawings, in which—

Fig. 1 is a perspective view of a roadway vehicle with which is associated my present invention.

Fig. 2 is a detail view partly in section illustrating my present invention.

Fig. 3 is a detail sectional view taken on lines 3—3 of Fig. 5 of the signal structure forming part of my present invention.

Fig. 4 is a sectional view taken on the lines 4—4 of Fig. 2.

Fig. 5 is a plan view of the signal casing forming part of my present invention.

Fig. 6 is a sectional view taken on the lines 6—6 of Fig. 3.

Fig. 7 is a sectional view taken on the lines 7—7 of Fig. 3.

Referring more particularly to the drawings, the invention is applicable to a motor vehicle of a type illustrated by the numeral 10 in Fig. 1 which includes a controlling foot pedal 11 to which is secured a reciprocating arm 12 actuated thereby.

Referring more particularly to Fig. 4, one preferable mode of associating the rod 12 with the pedal 11 is by the provision of a substantially U-shaped bracket 14 adapted to surround the lower portion of the foot pedal, and to be secured for movement therewith by a transversely extending pin 15. One leg of the U-shaped member is bent outwardly as at 16 and is apertured to receive therethrough a threaded extremity of the arm 12; adjustable nuts being provided at each side of the extension 16 to secure the same in adjusted relation with respect to the arm 12, whereby ready adjustment of the relative positions of the rod 12 with respect to the pedal 11 is provided.

The rod 12 is preferably journalled within a suitable bearing 18 secured in any desired manner to a suitable portion of the vehicle frame. The rearward extremity of the rod 12 is enlarged to provide a reciprocating piston 19 upon which suitable threads 20 are provided. For causing rotation of an associated signal operating rod 21 there is provided a rotatable cylinder 22 extending inwardly from the walls of which a cooperating thread 23 is provided adapted to be received within the thread 20 of the piston 19.

The cylinder 22 is rotatably mounted within a suitable bracket 24 secured through the threaded members 25 to the vehicle frame as illustrated in Fig. 7. As rotation of the arm 12 is prevented through its association with the U-shaped member 14 and the pedal 11, it will be seen that upon reciprocation of the arm 12, relative rotation between it and the cylinder 22 must result due to the prevention of reciprocation of the cylinder 22 therewith by external shoulders 26 carried thereby and abutting the side edges of the bracket 24. The arrangement is such that upon reciprocation of the rod 12 in response to movement of the pedal 11, the cylinder 22 is rotated, thus rotating the rod 21 which is rigidly secured thereto as shown in Fig. 2.

For controlling the movement of the signalling arm in response to rotation of the rod 21, the rear extremity of the rod 21 is disposed at right angles to the cylinder 22 to form a lever 27 to the extremity of which is secured a link 28 of a chain 30, the opposite end of which is secured to a rotatable signal arm casing 31 as shown at 32.

Referring more particularly to Figs. 3, 5 and 6 of the drawings, the signal includes a circular body 33 through the rear wall 34 of which a suitable illuminating bulb 35 extends. The front of the casing 33 is provided with a suitable lens 36 adapted to form in combination with the normally illuminated bulb 35, a rear light for the vehicle. The side wall 37 of the body 33 is provided with a plurality of apertures 38 within which are provided panels of variously colored glass preferably including a red panel 39, a yellow panel 40 and a green panel 41. The casing 33 is preferably secured to the body of the vehicle through suitable brackets 42.

Associated with the casing 33 and mounted within a suitable groove in the side walls thereof for rotation with respect thereto, there is provided a casing 31 movable in response to the movements of the chain 30 through its connection as at 32 as hereinbefore described.

Formed integral with the casing 32, a signal arm 43 is provided, the front side of which is open and adapted to receive a clear glass 44. The inner end of the arm 43 is also open and adapted to communicate upon movement with the apertures 38 in the sides of the body 33, whereby the glass 44 will be illuminated by the bulb 35 in a color corresponding to the color of the panels 39, 40 or 41 with which the open inner end of the arm 43 is communicating. The arm 43 is normally urged to the horizontal position as shown in Figs. 5 and 6 through the medium of a contractile spring 45 associated therewith and with the casing 33.

In the operation of the device with the foot pedal in inoperative raised position, in which position it is normally held by a spring (not shown), the arm 12 is in a rearward position received within the cylinder 22, and the cylinder having been rotated in a counter-clockwise direction, and being sustained in this position by the spring tension holding the pedal 11 in its raised position, maintains the signal arm 43 in the vertical position indicated by the dotted lines 46 of Fig. 5 against the tension of the spring 45.

Upon depression of the pedal 11, the rod 12 and the piston 19 move forwardly rotating the cylinder 22 and rod 21 in a clockwise manner, thus permitting clockwise rotation of the signal casing 31 about the body 33, whereby it may assume the position indicated by the dotted lines 47, and be illuminated through the yellow panel 40 to give a warning signal to the following traffic. Upon complete depression of the pedal 11, the signal arm 43 is permitted to move under the influence of the spring 45 to the horizontal position shown by the full lines in Fig. 5, whereby it is illuminated through the red panel 39 and a danger signal is thus provided. It will be understood that in the vertical position indicated by the dotted lines 46 that the signal arm is illuminated through the panel 41 giving a green safety signal to the following traffic.

Upon releasing the pedal 11 it assumes its normal upright position and the signal arm 44 again assumes its upright position 46 and is illuminated through the panel 41.

Obviously various changes and modifications of the invention may be resorted to without departing from the spirit or scope of the present invention as outlined in the claim.

I claim:

The combination with a vehicle signal device, of means for actuating said device including a chain and a rotatable shaft associated therewith, said shaft including an internally-threaded cylinder adapted to receive an externally threaded piston controlled by a vehicle control pedal.

BENEDICT MAYER.